United States Patent
Yoshida et al.

(10) Patent No.: US 7,646,118 B2
(45) Date of Patent: Jan. 12, 2010

(54) PORTABLE POWER WORKING MACHINE

(75) Inventors: Kenichi Yoshida, Tokyo (JP); Hideki Tomiyama, Tokyo (JP); Masanobu Yoshimura, Tokyo (JP); Toshiyuki Suzuki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 273 days.

(21) Appl. No.: 11/905,502

(22) Filed: Oct. 1, 2007

(65) Prior Publication Data
US 2008/0106159 A1    May 8, 2008

(30) Foreign Application Priority Data
Oct. 2, 2006    (JP)    ............... 2006-270425

(51) Int. Cl.
*H02K 9/06* (2006.01)
*H02K 9/26* (2006.01)
(52) U.S. Cl. .................... 310/60 R; 310/50; 310/62; 310/64; 30/276; 56/255
(58) Field of Classification Search ............... 310/50, 310/58, 60 R, 62, 60 A, 64; 30/276, 380–387; 56/12.5, 16.7, 17.5, 255–256
See application file for complete search history.

(56) References Cited

U.S. PATENT DOCUMENTS

| | | | | |
|---|---|---|---|---|
| 4,742,257 A | * | 5/1988 | Carpenter | 310/62 |
| 6,700,235 B1 | * | 3/2004 | McAfee | 310/52 |
| 6,731,036 B2 | * | 5/2004 | Ghiotto | 310/89 |
| 6,734,584 B1 | * | 5/2004 | Browne et al. | 310/58 |
| 2005/0073210 A1 | * | 4/2005 | Rocky et al. | 310/216 |
| 2006/0186743 A1 | * | 8/2006 | Habel et al. | 310/58 |

FOREIGN PATENT DOCUMENTS

| | | | |
|---|---|---|---|
| JP | 6-62637 | | 3/1994 |
| JP | 06197495 A | * | 7/1994 |
| JP | 2004-8054 | | 1/2004 |

* cited by examiner

*Primary Examiner*—Tran N Nguyen
(74) *Attorney, Agent, or Firm*—Smith, Gambrell & Russell, LLP (57) ABSTRACT

A portable power working machine includes a drive unit disposed in a motor housing connected to a proximal end of an operating arm. The drive unit rotates a cutting blade at a distal end of the operating arm. The motor housing has an inlet and an outlet for cooling air in front and rear sections, respectively. The drive unit includes an electric motor disposed near the front end of the motor housing, a cooling fan disposed near the rear end of the motor housing and connected to an output shaft of the electric motor, and a heat sink disposed between the cooling fan and the electric motor so as to extend from the electric motor. The cooling air drawn in through the inlet by the cooling fan is guided through a gap between the drive unit and an inner surface of the motor housing and is discharged through the outlet.

10 Claims, 5 Drawing Sheets

PORTABLE POWER WORKING MACHINE

CROSS REFERENCE TO RELATED APPLICATIONS

The disclosure of Japanese Application No. 2006-270425 filed on Oct. 2, 2006 including the specification, drawings, and abstract is incorporated herein by reference in its entirety.

BACKGROUND OF THE INVENTION

1. Field of the Invention

The present invention relates to a portable power working machine, such as a bush cutter, that drives an actuating part, such as a cutting blade, provided at a distal end of an operating arm with an electric motor.

2. Description of the Related Art

Portable power working machines, such as portable bush cutters, are generally used for cutting weeds on footpaths between fields, undergrowth and grass in forests, etc.

As an example of this type of bush cutter, Japanese Unexamined Patent Application Publication No. 2004-8054 discloses a bush cutter including a pipe-shaped operating arm, a drive shaft extending through the operating arm, an engine provided at a proximal end of the operating arm and caused to rotate the drive shaft, and a cutting blade disposed at a distal end of the operating arm and rotated by the rotation of the drive shaft. This bush cutter has a loop strap attached to the operating arm at a position near the proximal end thereof, and an operator carries the bush cutter by placing the strap around the shoulder. In this state, the operator holds a bar-shaped handle provided on the operating arm and moves the operating arm in the front-rear and left-right directions to cut weeds and the like.

In densely housed areas, such as urban areas, where quietness is required, bush cutters having electric motors as a power source are often used instead of bush cutters having engines as a power source. An example of a bush cutter including an electric motor as a power source is described in Japanese Unexamined Patent Application Publication No. 6-62637. This bush cutter includes a pipe-shaped operating arm; a motor housing connected to a distal end of the operating arm; an electric motor contained in the motor housing and having a fan attached thereto; a cutting blade disposed below the motor housing and driven by the electric motor; and a battery housing containing a battery and disposed at a proximal end of the operating arm. An inlet and an outlet for cooling air are formed in the battery housing and the motor housing, respectively.

This bush cutter has a loop strap attached to the operating arm at a position near the proximal end thereof, and an operator carries the bush cutter by placing the strap around the shoulder. In this state, the operator activates the electric motor, and accordingly the cutting blade and the fan starts to rotate. The operator holds a handle provided on the operating arm and moves the operating arm in the front-rear and left-right directions to cut weeds and the like with the rotating cutting blade. At the same time, atmospheric air is drawn into the battery housing through the inlet as cooling air due to the rotation of the fan. The air flows through the operating arm and the motor housing, and is discharged into the atmosphere through the outlet. The cooling air cools the battery and the electric motor.

The bush cutter described in Japanese Unexamined Patent Application Publication No. 6-62637 causes less noise and quietness is ensured because the electric motor is used as a drive source. However, since the electric motor is disposed near the cutting blade at the distal end of the operating arm, the center of gravity is close to the distal end of the operating arm when the operator carries the bush cutter by placing the strap around the shoulder. Therefore, it is difficult to move the distal end of the operating arm in the front-rear and left-right directions. As a result, work efficiency is reduced and the burden on the operator is increased.

The cooling air used for cooling the electric motor is discharged into the atmosphere through the outlet formed in the motor housing. Therefore, foreign matters such as dust generated when weeds and the like are cut by the rotating cutting blade tend to enter the motor housing through the outlet. These foreign matters cause abrasion of rotating components, such as bearings, and reduce endurance of the electric motor. In addition, the outlet is easily clogged with weeds and the like that are cut by the cutting blade. If this happens, the flow of the cooling air is degraded and performance in cooling the electric motor and the like is reduced.

Furthermore, the battery and the electric motor must be connected to each other with long wires, which requires cumbersome tasks of wiring and maintenance. In addition, a battery with a large capacity is required, and use of such a battery leads to an increase in the weight of the bush cutter.

These problems occur not only in bush cutters, but also in other kinds of portable power working machines having an electric motor and an actuating part at a distal end of an operating arm.

SUMMARY OF THE INVENTION

In light of the above-described situation, an object of the present invention is to provide a portable power working machine with high operability, endurance, and cooling performance for a drive source, such as an electric motor.

To achieve the above-described object, according to a first aspect of the present invention, a portable power working machine includes a pipe-shaped operating arm; a drive shaft extending through the operating arm; an actuating part attached to a distal end of the operating arm and driven by rotation of an electric motor through the drive shaft, the electric motor being disposed at a proximal end of the drive shaft; shoulder carrying means disposed near a proximal end of the operating arm; a motor housing connected to the proximal end of the operating arm at a front end thereof and including a tubular peripheral portion extending in a direction in which the operating arm extends, and a rear side portion closing a rear end of the tubular peripheral portion, the peripheral portion having an inlet for cooling air at a front side thereof and an outlet at a rear side thereof; and a drive unit including the electric motor, a cooling fan, and a heat sink. The electric motor is disposed near the front end of the motor housing and includes a cylindrical stator, an electric motor cover attached to the stator and an output shaft projecting forward and rearward from the electric motor cover. The cooling fan is provided at a rear end of the output shaft. The heat sink being disposed between the electric motor cover and the cooling fan so as to extend from the electric motor cover and facing an inner surface of the peripheral portion with a gap therebetween. The drive unit is disposed in the motor housing with a gap provided between the drive unit and the peripheral portion such that the stator corresponds to the inlet, the cooling fan corresponds to the outlet, and the heat sink faces the inner surface of the peripheral portion. A front end of the output shaft is connected to the drive shaft for transferring power to the drive shaft, and a cooling-air passage is provided between the motor housing and the drive unit for guiding the cooling air from the inlet to the outlet through the cooling fan.

According to the first aspect, the electric motor, which is relatively heavy, is disposed near the front end of the motor housing, and the center of gravity of the portable power working machine is positioned near the proximal end of the operating arm where the shoulder carrying member is attached. Therefore, the center of gravity of the portable power working machine is not shifted toward the front end or the rear end with respect to the operator, and the portable power working machine can be carried in a balanced state. Therefore, the operator can easily move the distal end of the operating arm in the front-rear and left-right directions. As a result, the work efficiency can be increased and burden on the operator can be greatly reduced.

In addition, the inlet and the outlet for cooling air are respectively formed in the motor housing at positions near the front end and the rear end thereof, and a cooling air passage extending from the inlet to the outlet through the fan is provided between the motor housing and the drive unit. Accordingly, the electric motor and the like are cooled by the cooling air that is drawn into the motor housing through the inlet and guided between the motor housing and the drive unit. Therefore, the entire body of the electric motor and the like are efficiently cooled by the cooling air and the cooling performance can be ensured. In addition, the inlet and the outlet are formed at positions greatly distant from the actuating part provided at the distal end of the operating arm, and at relatively high positions above the ground when the operator carries the portable power working machine. Therefore, foreign matters such as dust are prevented from entering the motor housing through the inlet or the outlet. As a result, drive components of the electric motor and the like can be protected from the foreign matters such as dust and the endurance can be increased.

According to a second aspect of the present invention, a portable power working machine includes an operating arm; a drive shaft extending through the operating arm; a motor housing connected to a proximal end of the operating arm at a front end thereof; an actuating part provided at a distal end of the operating arm; and a drive unit disposed in the motor housing, the drive unit driving the actuating part through the drive shaft. The motor housing has an inlet for cooling air at a position near a front end thereof and an outlet for the cooling air at a position near a rear end opposite to the front end thereof. The drive unit includes an electric motor disposed near the front end of the motor housing, a cooling fan disposed near the rear end of the motor housing and connected to an output shaft of the electric motor, and a heat sink disposed between the cooling fan and the electric motor so as to extend from the electric motor. The cooling air drawn into the motor housing through the inlet in the motor housing by the cooling fan is guided through a gap between the drive unit and an inner surface of the motor housing and is discharged to the outside through the outlet in the motor housing.

According to the second aspect, the inlet and the outlet for cooling air are respectively formed in the motor housing at positions near the front end and the rear end thereof. In addition, a cooling air passage is provided so that the cooling air drawn into the motor housing through the inlet by the cooling fan passes through a gap provided between the drive unit and the inner surface of the motor housing and is discharged to the outside through the outlet. Therefore, the entire body of the electric motor and the like are efficiently cooled by the cooling air. In addition, the inlet and the outlet are formed at positions greatly distant from the actuating part provided at the distal end of the operating arm, and at relatively high positions above the ground when the operator carries the portable power working machine. Therefore, foreign matters such as dust are prevented from entering the motor housing through the inlet or the outlet. As a result, drive components of the electric motor and the like can be protected from the foreign matters such as dust and the endurance can be increased.

In addition, the electric motor, which is relatively heavy, is disposed near the front end of the motor housing. Therefore, the center of gravity of the portable power working machine is not shifted toward the front end or the rear end with respect to the operator, and the portable power working machine can be carried in a balanced state. Therefore, the operator can easily move the distal end of the operating arm in the front-rear and left-right directions. As a result, the work efficiency can be increased and burden on the operator can be greatly reduced.

In the portable power working machine according to the second aspect, preferably, the electric motor includes a stator and an electric motor cover and has a cooling-air introduction opening provided between the stator and the electric motor cover and a cooling-air discharge opening provided in the electric motor cover at a position near the rear end of the motor housing, and the cooling air drawn into the motor housing through the inlet in the motor housing by the cooling fan is guided into the electric motor through the cooling-air introduction opening and out of the electric motor through the cooling-air discharge opening, and is discharged to the outside through the outlet in the motor housing.

In such a case, another cooling air passage is provided so that the cooling air is guided into the electric motor through the cooling-air introduction opening and out of the electric motor through the cooling-air discharge opening. Thus, the electric motor can also be cooled from the inside and the cooling efficiency can be increased.

In the above-described portable power working machine, preferably, the heat sink is disposed near the inlet in the motor housing.

In such a case, the heat sink, which particularly needs to be cooled, can be positively cooled and efficiency in cooling the electric motor and the like can be further increased.

In addition, preferably, the inlet in the motor housing has a cooling air guide that guides the cooling air in the circumferential direction of the output shaft.

In such a case, the cooling air drawn into the motor housing through the inlet flows along the inner surface of the motor housing, and the electric motor and the like can be evenly cooled.

In addition, preferably, the portable power working machine further includes a shoulder carrying member at a position near the proximal end of the operating arm.

In such a case, the shoulder carrying member is positioned near the center of gravity of the portable power working machine. Therefore, the operator can carry the portable power working machine in a balanced state. As a result, the work efficiency can be increased and burden on the operator can be greatly reduced.

In the above-described portable power working machine, the actuating part may be a cutting blade that is rotated by the rotation of the drive shaft. In this case, the actuating part is a cutting blade driven by the drive shaft, and the portable power working machine functions as a bush cutter.

According to the aspects of the present invention, the inlet and the outlet for cooling air are respectively formed in the motor housing at positions near the front end and the rear end thereof. In addition, a cooling air passage is provided so that the cooling air drawn into the motor housing through the inlet by the cooling fan passes through a gap provided between the drive unit and the inner surface of the motor housing and is discharged to the outside through the outlet. Therefore, the entire body of the electric motor and the like are efficiently cooled by the cooling air. In addition, the electric motor, which is relatively heavy, is disposed near the front end of the motor housing. Therefore, the center of gravity of the portable power working machine is not shifted toward the front end or the rear end with respect to the operator, and the portable power working machine can be carried in a balanced state. Therefore, the operator can easily move the distal end of the operating arm in the front-rear and left-right directions. As a result, the work efficiency can be increased and burden on the operator can be greatly reduced.

DESCRIPTION OF THE PREFERRED EMBODIMENTS

A bush cutter will be explained below with reference to FIGS. 1 to 5 as a portable power working machine according to an embodiment of the present invention.

Figure 1:
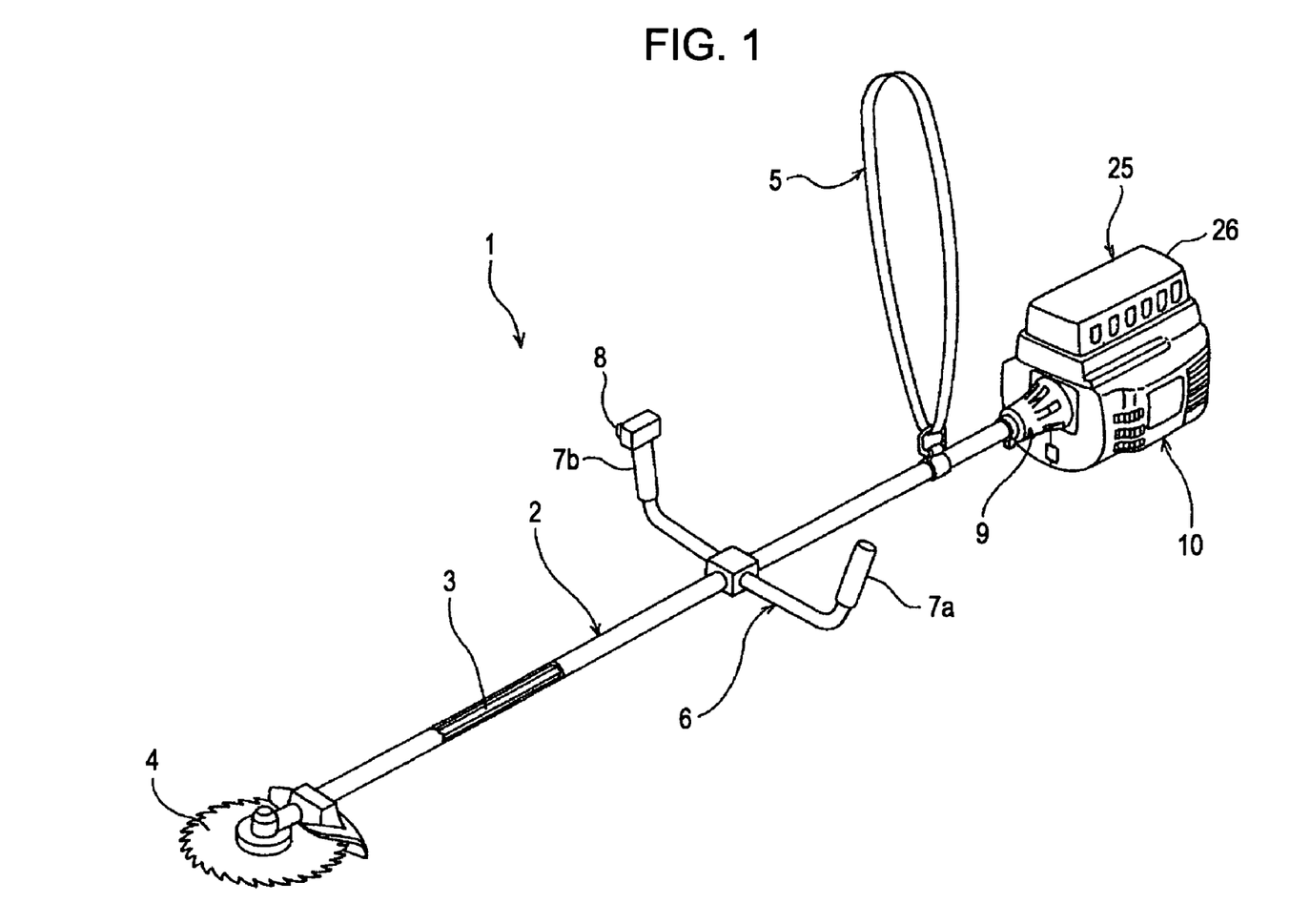
FIG. 1 is a perspective view illustrating a bush cutter as a portable power working machine according to an embodiment of the present invention.

First, the external appearance of a bush cutter 1 according to the present embodiment will be described. FIG. 1 is a perspective view of the bush cutter 1 according to the present embodiment. The bush cutter 1 includes a pipe-shaped elongated operating arm 2, a drive shaft 3 extending through the operating arm 2, and a motor housing 10. A front end of the motor housing 10 is attached to a proximal end of the operating arm 2 with a joint 9. The motor housing 10 contains a drive unit 30, which will be described below, and the drive unit 30 includes an electric motor 31 that rotates the drive shaft 3. A cutting blade 4, which corresponds to an actuating part, provided at a distal end of the operating arm 2 is rotated by the rotation of the drive shaft 3.

The operating arm 2 has a loop-shaped shoulder strap 5, which functions as shoulder carrying means, at a position close to the proximal end thereof, that is, at a position close to the motor housing 10. The operating arm 2 also has a bar-shaped handle 6 that extends in the left-right direction and that is attached at a central position of the operating arm 2 in the longitudinal direction. The handle 6 has grips 7a and 7b at either end thereof. An operation unit 8 for operating the electric motor 31 and the like is provided on the right grip 7b. A battery box 25 containing a battery that functions as a power source for the drive unit 30 is disposed on top of the motor housing 10.

An operator carries the bush cutter 1 by placing the shoulder strap 5 around the shoulder, and grabs the left and right grips 7a and 7b on the handle 6. Then, the operator activates the electric motor 31 by operating the operation unit 8. The operator moves the operating arm 2 in the front-rear and left-right directions with the handle 6, thereby cutting weeds and the like with the rotating cutting blade 4.

Figure 2:
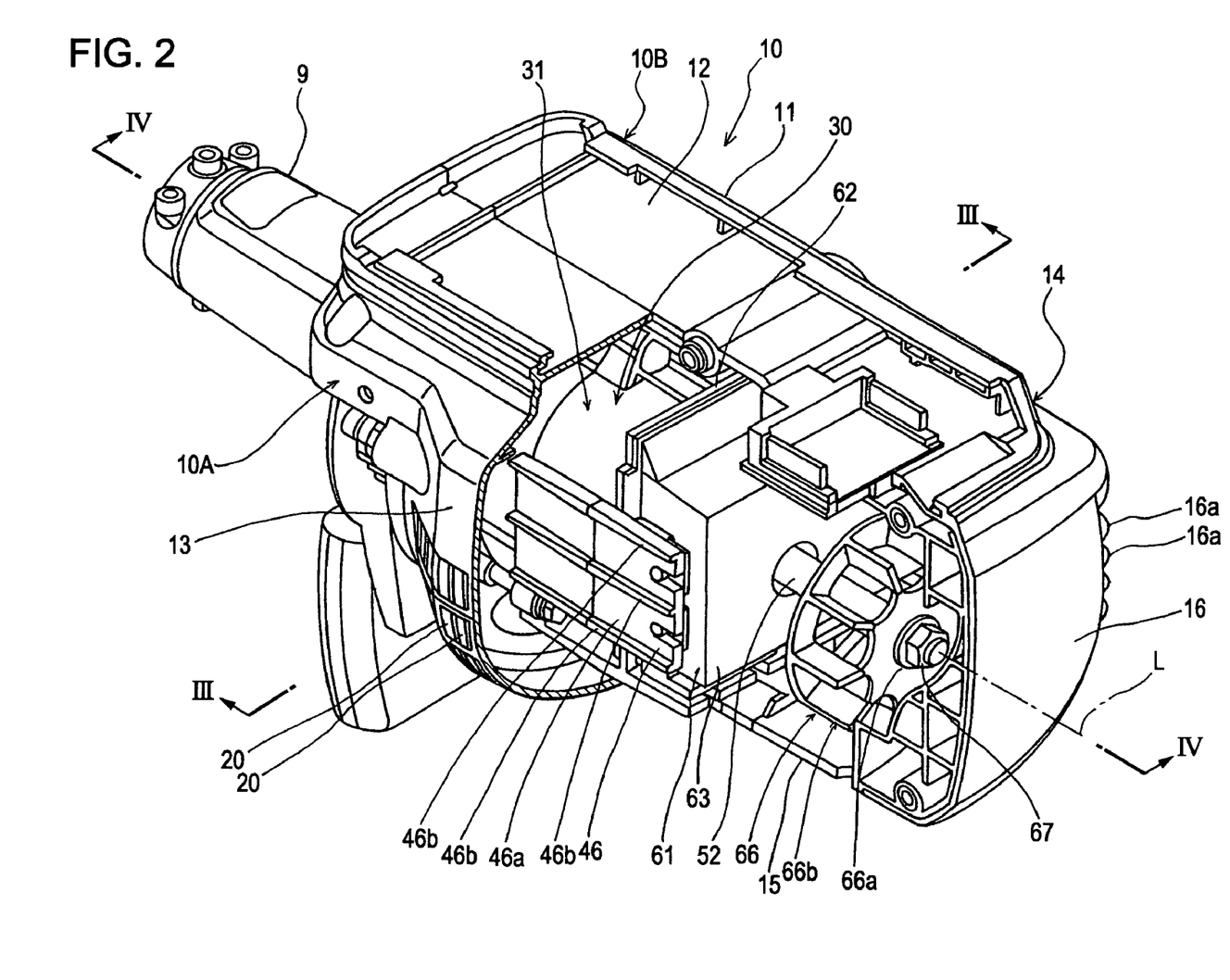
FIG. 2 is a partially broken perspective view of a motor housing.
Figure 3:
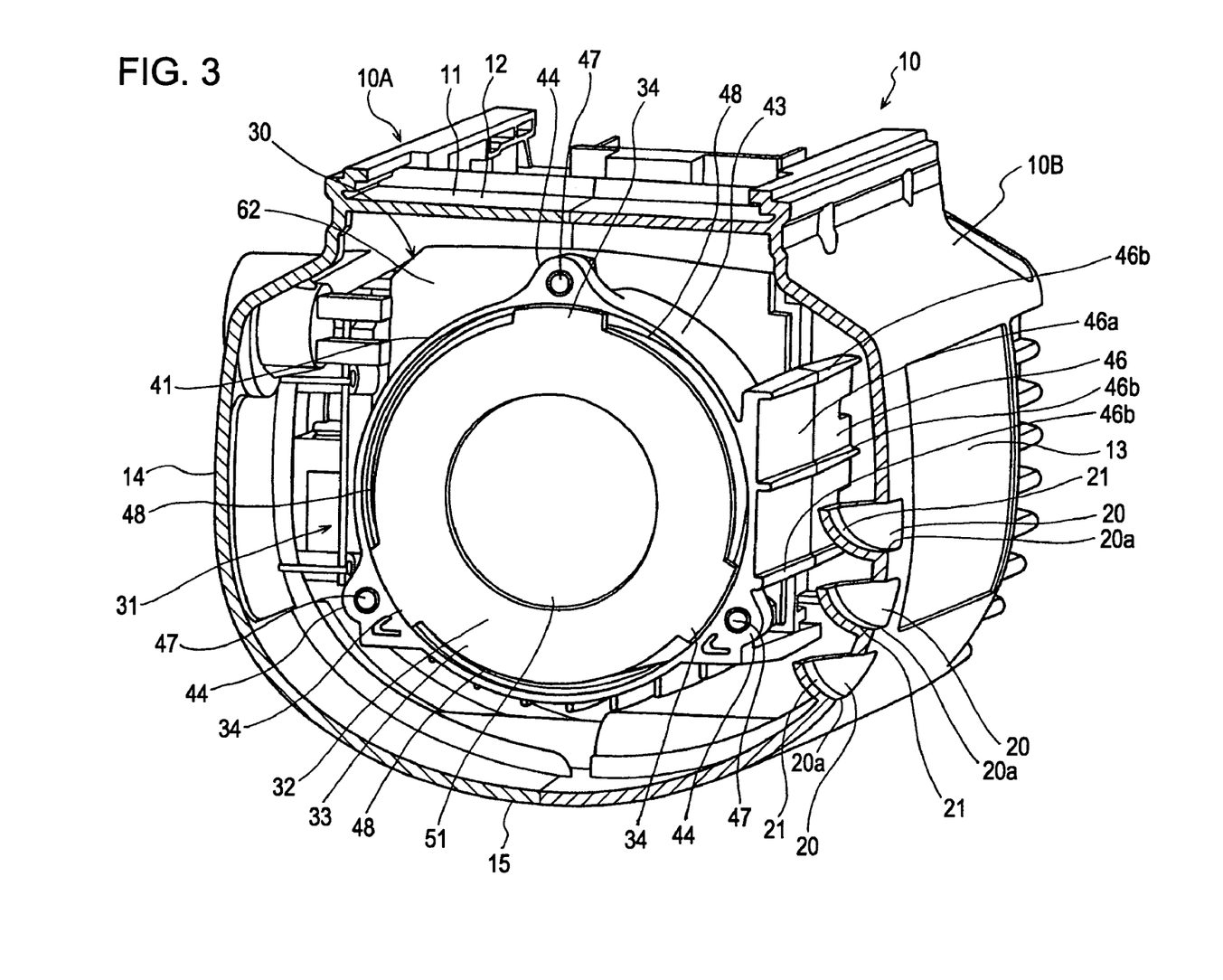
FIG. 3 is a sectional perspective view of FIG. 2 taken along line III-III.
Figure 4:
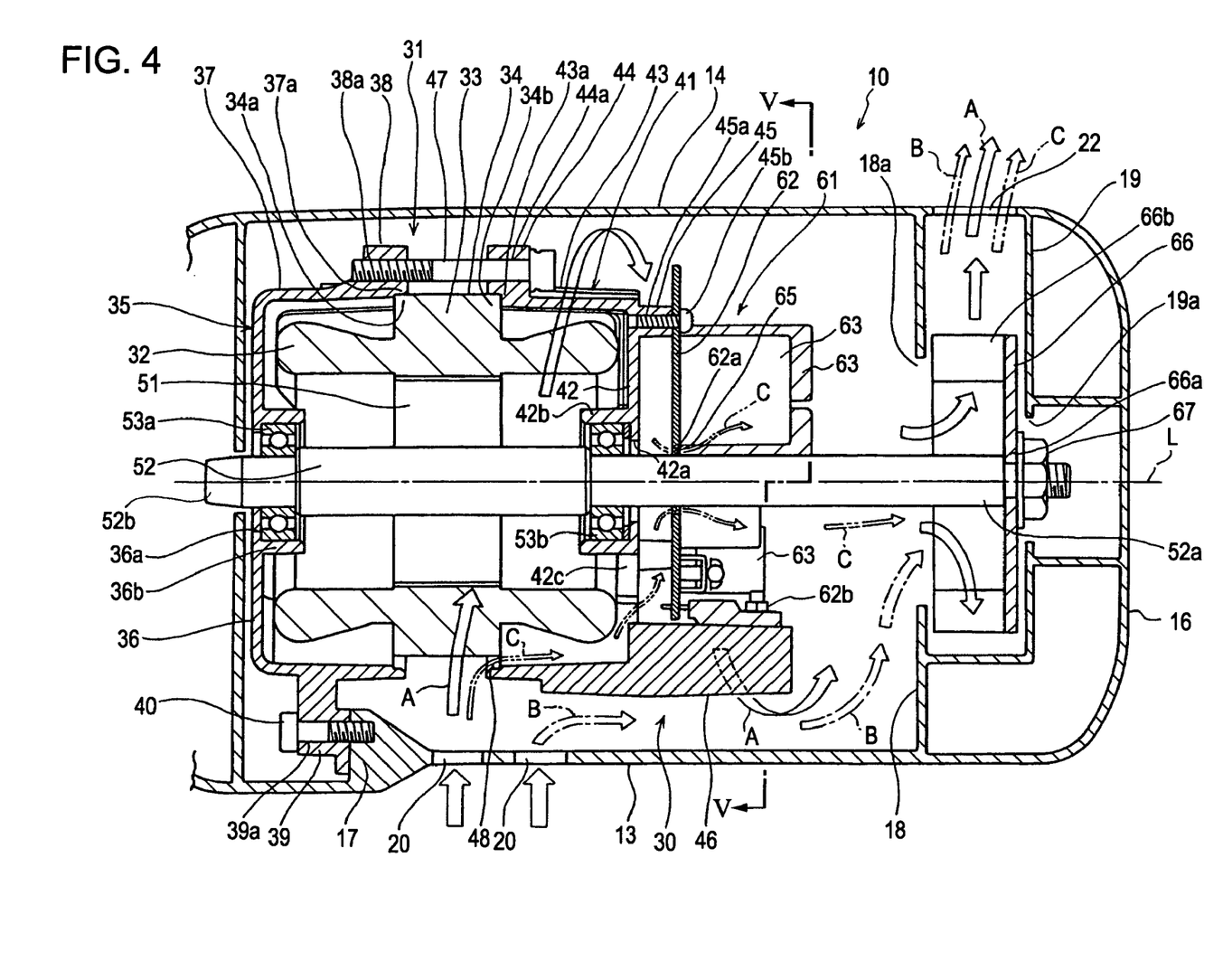
FIG. 4 is a sectional view of FIG. 2 taken along line IV-IV.
Figure 5:
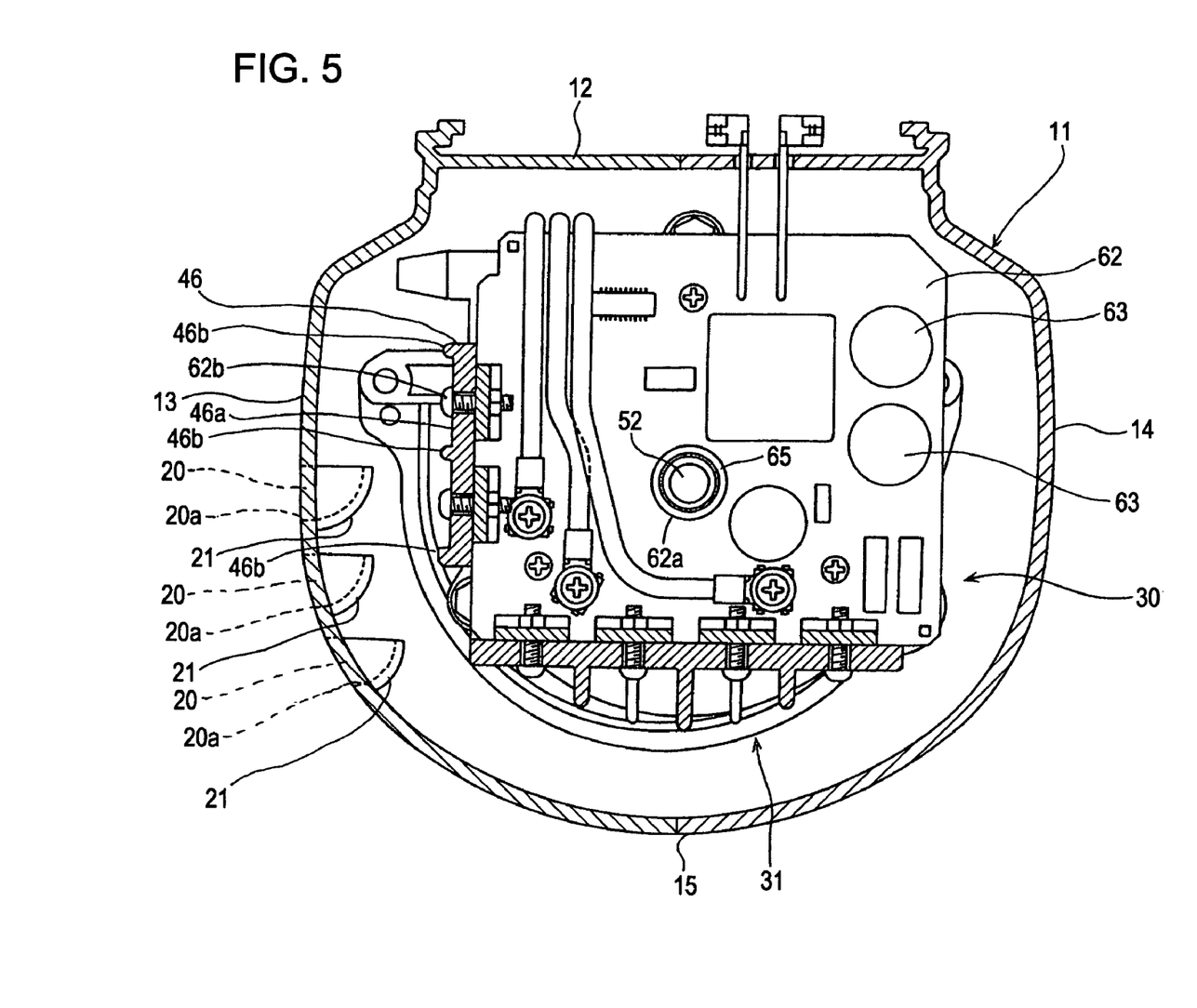
FIG. 5 is a sectional view of FIG. 4 taken along line V-V.

The motor housing 10 and the drive unit 30 contained in the motor housing 10 will be described in more detail. FIG. 2 is a partially broken perspective view of the motor housing 10, FIG. 3 is a sectional perspective view of FIG. 2 taken along line III-III; FIG. 4 is a sectional view of FIG. 2 taken along line IV-IV; and FIG. 5 is a sectional view of FIG. 4 taken along line V-V.

As shown in FIGS. 2 and 3, the motor housing 10 includes left and right housing members 10A and 10B that can be divided from each other along a central axis L that coincides with a central axis of the operating arm 2. For convenience of explanation, the state in which the housing members 10A and 10B are integrated together will be explained in the following description. The motor housing 10 has a tubular peripheral portion 11 and has a hollow structure with the rear end closed by a rear end portion 16 having cooling fins 16a at the rear end thereof. The peripheral portion 11 has a flat top portion 12 that functions as a bottom portion of the battery box 25, left and right side portions 13 and 14 having an arc shape in cross section and extending downward from the left and right edges of the top portion 12, and a bottom portion 15 that smoothly connects the bottom edges of the left and right side portions 13 and 14. In FIGS. 2 to 5, a battery cover 26 that forms the hollow battery box 25 together with the top portion 12 is not shown for simplicity.

As shown in FIG. 4, the motor housing 10 contains an output shaft 52 that extends continuously along the central axis L from a front end to a rear end thereof, the electric motor 31 disposed at the front end of the output shaft 52, and a fan 66 disposed at the rear end of the output shaft 52. A unit of a heat sink 46 extending from a rear cover 41 of the electric motor 31 and a control device 61 for controlling the electric motor 31 is disposed between the rear cover 41 and the fan 66. The drive unit 30 including the electric motor 31, the heat sink 46, the control device 61, the fan 66, etc., will be described in detail below.

The motor housing 10 has an electric-motor retaining portion 17 at the front end thereof. In addition, a front separation wall 18 having an opening 18a and a rear separation hole 19 having an opening 19a are disposed at the rear end of the motor housing 10 with a space therebetween for accommodating the fan 66. The left side portion 13 of the motor housing 10 has inlets 20 for cooling air that are arranged in a grill-like pattern at the front end of the left side portion 13 so as to correspond to a stator 32 of the electric motor 31. In addition, an outlet 22 is formed at the rear end of the right side portion 14 of the motor housing 10 on the side opposite to the inlet 20 so as to correspond to the space between the front separation wall 18 and the rear separation wall 19 where the fan 66 is disposed.

As shown in FIG. 3, each inlet 20 has a cooling air guide 21 having an arc shape in cross section that is curved upward from a bottom end 20a of the inlet 20 toward the inside of the motor housing 10. The cooling air guides 21 guide the cooling air drawn into the motor housing 10 through the inlets 20 upward along the inner surface of the left side portion 13 and prevent rainwater and the like from entering the motor housing 10 through the inlets 20.

As shown in FIG. 4, the electric motor 31 of the drive unit 30 includes the stator 32 having a cylindrical shape, a front cover 35 attached to the front of the stator 32, the rear cover 41 attached to the rear of the stator 32, and a rotor 51 supported by the output shaft 52 that extends along the central axis L.

The stator 32 has a stator main body 33 having a cylindrical shape with inner and outer surfaces and a plurality of fitting projections 34 arranged along the outer periphery of the stator main body 33 at constant intervals therebetween. In the present embodiment, three fitting projections 34 are formed (See FIG. 3).

As shown in FIG. 4, the front cover 35 includes a disc-shaped front side portion 36 and a cylindrical peripheral portion 37 that are formed integrally with each other. The front side portion 36 has a through hole 36a and a bearing holder 36b at the center. The peripheral portion 37 extends rearward continuously from the outer circumference of the front side portion 36 with a gap provided between the peripheral portion 37 and the peripheral portion 11 of the motor housing 10. The peripheral portion 37 has engagement parts 37a arranged along the inner periphery of the peripheral portion 37 at the rear end thereof, and the engagement parts 37a are engaged with front parts 34a of the fitting projections 34 provided on the stator 32. The peripheral portion 37 also has a plurality of connecting parts 38 with screw holes 38a that are arranged with constant intervals along the outer periphery of the peripheral portion 37 at the rear end thereof. In the present embodiment, three connecting parts 38 are formed. In addition, the peripheral portion 37 also has an attachment part 39 with a bolt hole 39a on the outer periphery of the peripheral portion 37 for allowing attachment to the electric-motor retaining portion 17 of the motor housing 10 with a bolt 40.

As shown in FIG. 4, the rear cover 41 includes a disc-shaped rear side portion 42 and a cylindrical peripheral portion 43 that are formed integrally with each other. The rear side portion 42 has a through hole 42a and a bearing holder 42b at the center. The peripheral portion 43 extends forward continuously from the outer circumference of the rear side portion 42 with a gap provided between the peripheral portion 43 and the peripheral portion 11 of the motor housing 10. The peripheral portion 43 has engagement parts 43a arranged along the inner periphery of the peripheral portion 43 at the front end thereof, and the engagement parts 43a are engaged with rear parts 34b of the fitting projections 34 provided on the stator 32. The peripheral portion 43 also has a plurality of connecting parts 44 with bolt holes 44a that are arranged along the outer periphery of the peripheral portion 43 at the front end thereof so as to face the connecting parts 38 provided on the front cover 35. In addition, a plurality of projections 45 having screw holes 45a are formed on the outer surface of the rear side portion 42 so as to project rearward. The rear side portion 42 has a cooling-air introduction opening 42c formed therein.

The heat sink 46 extends rearward from the peripheral portion 43 of the rear cover 41 so as to face the inner surface of the left side portion 13 of the motor housing 10 that has the inlets 20. The heat sink 46 is plate shaped and has a plurality of cooling fins 46b projecting therefrom.

The front cover 35 and the rear cover 41 having the above-described structure are assembled together as follows. That is, the engaging parts 37a of the front cover 35 are fitted to the front parts 34a of the fitting projections 34 on the stator 32, and the engaging parts 43a of the rear cover 41 are fitted to the rear parts 34b of the fitting projections 34. In this state, the connecting parts 38 and the corresponding connecting parts 44 are caused to face each other. Then, connecting bolts 47 are inserted through the bolt holes 44a in the connecting parts 44 and screwed into the screw holes 38a formed in the connecting parts 38, so that the stator 32 is clamped in the front-rear direction. An arc-shaped cooling-air introduction opening 48 is formed between the stator main body 33 of the stator 32 and the front end of the peripheral portion 43 of the rear cover 41 that are assembled together.

The output shaft 52 that supports the rotor 51 is rotatably supported by bearings 53a and 53b that are respectively held by the bearing holder 36b of the front cover 35 and the bearing holder 42b of the rear cover 41. A fan attachment part 52a is provided at the rear end of the output shaft 52 that projects through the through hole 42a in the rear cover 41.

The control device 61 includes a substrate 62 that is attached to the projections 45 projecting from the rear side portion 42 of the rear cover 41 with attachment bolts 45b. The substrate 62 has an output-shaft through hole 62a through which the output shaft 52 extends with a gap provided therebetween, and has a rectangular plate shape such that a gap is provided between the outer periphery of the substrate 62 and the peripheral portion 11 of the motor housing 10. A gap between the output-shaft through hole 62a in the substrate 62 and the output shaft 52 defines a cooling air guide opening 65 around the output shaft 52. The substrate 62 is heat-conductively connected with a bolt 62b or the like to the heat sink 46 that is formed integrally with the rear cover 41. Electronic components 63 of the control device 61 are attached to the substrate 62. In FIG. 2, the electronic components 63 are drawn in a box-like shape for simplicity.

The fan attachment part 52a provided at the rear end of the output shaft 52 extends into the space between the front separation wall 18 and the rear separation wall 19 through the opening 18a formed in the front separation wall 18. The fan 66 disposed between the front separation wall 18 and the rear separation wall 19 is attached to the fan attachment part 52a. The fan 66 is attached by fixing a boss portion 66a thereof to the fan attachment part 52a of the output shaft 52 with a nut 67. The fan 66 is a sirocco fan having a plurality of blades 66b along the outer periphery thereof.

A front end portion 52b of the output shaft 52 extends into the joint 9 and is connected to the proximal end of the drive shaft 3 extending through the operating arm 2 with or without a centrifugal clutch disposed in the joint 9. The connection is provided such that power can be transmitted from the output shaft 52 to the drive shaft 3.

In the bush cutter 1 having the above-described structure, the electric motor 31, which is relatively heavy, is disposed at the front end of the motor housing 10. Therefore, the center of gravity of the bush cutter 1 is at a position near the proximal end of the operating arm 2 where the shoulder strap 5 is attached.

When the fan 66 rotates, atmospheric air is drawn into the motor housing 10 through the inlet 20 as cooling air. The cooling air is guided upward along the inner surface of the left side portion 13 by the cooling air guides 21 and flows through the space between the inner surface of the peripheral portion 11 of the motor housing 10 and the outer peripheral surface of the drive unit 30. Then, the cooling air is discharged to the outside from the outlet 22 through the fan 66. Thus, a first cooling air passage shown by the arrow A for cooling mainly the electric motor 31 and the control device 61 from the outer surfaces thereof is provided.

The cooling air drawn into the motor housing 10 through the inlet 20 is also guided toward the rear end of the motor housing 10 along the left side portion 13 and an outer surface 46a of the heat sink 46, and is discharged to the outside from the outlet 22 through the fan 66. Thus, a second cooling air passage shown by the arrow B for cooling mainly the heat sink 46 is provided.

The cooling air drawn into the motor housing 10 through the inlet 20 is also guided into the rear cover 41 through the cooling-air introduction opening 48 formed between the stator main body 33 of the stator 32 and the front end of the peripheral portion 43 of the rear cover 41. The cooling air guided into the rear cover 41 flows into the space between the rear side portion 42 and the substrate 62 through the cooling-air introduction opening 42c in the rear cover 41. Then, the cooling air flows rearward from the substrate 62 through the cooling air guide opening 65 formed between the output-shaft through hole 62a in the substrate 62 and the output shaft 52, and is discharged to the outside from the outlet 22 through the fan 66. Thus, a third cooling air passage shown by the arrow C for cooling mainly the electric motor 31 and control device 61 from an area around the central axis L, that is, from the inside, is provided.

In the present embodiment, the motor housing 10 has the outlet 22 in a region opposite to the inlet 20. Therefore, the cooling air flows transversely through the motor housing 10, thereby reliably cooling the electric motor 31 and the control device 61.

When the bush cutter 1 is used for cutting weeds and the like, the operator carries the bush cutter 1 by placing the loop-shaped shoulder strap 5 attached at a position near the proximal end of the operating arm 2 around the shoulder. Then, the operator grabs the left and right grips 7a and 7b on the handle 6 and activates the electric motor 31 by operating the operation unit 8. In response to the activation of the electric motor 31, the cutting blade 4 provided at the distal end of the operating arm 2 is rotated by the drive shaft 3. The operator moves the operating arm 2 in the front-rear and left-right directions with the handle 6, thereby cutting weeds and the like with the rotating cutting blade 4.

During the process of cutting weeds and the like using the bush cutter 1, the center of gravity of the bush cutter 1 is positioned near the proximal end of the operating arm 2, and the shoulder strap 5 for carrying the bush cutter 1 is positioned near the center of gravity. Therefore, the center of gravity of the bush cutter 1 is not shifted toward the front end or the rear end with respect to the operator, and the bush cutter 1 can be carried in a balanced state. Therefore, the operator can easily move the distal end of the operating arm 2 in the front-rear and left-right directions with the handle 6. As a result, the work efficiency in cutting weeds can be increased and burden on the operator can be greatly reduced.

The entire bodies of the electric motor 31 and the control device 61 can be efficiently cooled from the outer surface and from the inside by the cooling air that flows through the first cooling air passage shown by the arrow A and the cooling air that flows through the third cooling air passage shown by the arrow C. In addition, the heat sink 46, which particularly needs to be cooled, can be positively cooled by the cooling air that flows through the second cooling air passage shown by the arrow B. Thus, efficiency in cooling the electric motor 31 and the control device 61 is increased.

The cooling air is drawn into the motor housing 10 through the inlet 20 formed in the left side portion 13 of the motor housing 10 at a position near the front end thereof, and is discharged into the atmosphere through the outlet 22 formed in the right side portion 14 of the motor housing 10 at a position near the rear end thereof. The inlet 20 and the outlet 22 are formed at positions distant from the cutting blade 4 provided at the distal end of the operating arm 2, and at relatively high positions above the ground when the operator carries the bush cutter 1. Therefore, foreign matters such as dust generated when weeds and the like are cut are prevented from entering the motor housing 10 through the inlet 20 or the outlet 22. As a result, rotating components, such as the bearings 53a and 53b, and the drive unit 30 can be isolated and protected from the foreign matters, such as dust, and the endurance can be increased. In addition, the inlet 20 and the outlet 22 are prevented from being clogged with weeds and the like and cooling performance for the electric motor 31 and the control device 61 is prevented from being reduced. As a result, a stable cooling performance can be obtained.

The electric motor 31 and the control device 61 contained in the motor housing 10 and the battery box 25 are positioned close to each other. Therefore, the tasks of wiring and maintenance are facilitated.

The above-describe embodiment of the present invention can be modified in various ways within the scope of the present invention. For example, in the above-described embodiment, each inlet 20 has the cooling air guide 21 having an arc shape in cross section that is curved upward from the bottom end 20a toward the inside of the motor housing 10. However, each inlet 20 may also have a cooling air guide having a shape such that the cooling air guide projects outward and extends downward from the upper end of the inlet 20. In addition, in the above-described embodiment, the inlets 20 are formed in a front region of the left side portion 13 of the motor housing 10. However, the inlets 20 may also be formed in a front region of the right side portion 14. In such a case, the heat sink 46 is preferably disposed so as to face the right side portion 14.

In addition, although a bush cutter is explained in the above-described embodiment, the present invention may also be applied to other various types of portable power working machines including a pipe-shaped operating arm, a drive shaft extending through the operating arm, an electric motor provided at a proximal end of the operating arm and caused to rotate the drive shaft, and a cutting blade disposed at a distal end of the operating arm and rotated by the rotation of the drive shaft.

What is claimed is:

1. A portable power working machine, comprising:
a pipe-shaped operating arm;
a drive shaft extending through the operating arm;
an actuating part provided at a distal end of the operating arm and driven by rotation of an electric motor through the drive shaft, the electric motor being disposed at a proximal end of the drive shaft;
shoulder carrying means disposed near a proximal end of the operating arm;
a motor housing connected to the proximal end of the operating arm at a front end thereof and including a tubular peripheral portion extending in a direction in which the operating arm extends, and a rear side portion closing a rear end of the tubular peripheral portion, a peripheral portion having an inlet for cooling air at a front side thereof and an outlet at a rear side thereof; and
a drive unit including the electric motor, a cooling fan, and a heat sink, the electric motor being disposed near the front end of the motor housing and including a cylindrical stator, an electric motor cover attached to the stator and an output shaft projecting forward and rearward from the electric motor cover, the cooling fan being provided at a rear end of the output shaft, the heat sink being disposed between the electric motor cover and the cooling fan so as to extend from the electric motor cover and facing an inner surface of the peripheral portion with a gap therebetween,
wherein the drive unit is disposed in the motor housing with a gap provided between the drive unit and the peripheral portion such that the stator corresponds to the inlet, the cooling fan corresponds to the outlet, and the heat sink faces the inner surface of the peripheral portion,
wherein a front end of the output shaft is connected to the drive shaft for transferring power to the drive shaft, and
wherein a cooling-air passage is provided between the motor housing and the drive unit for guiding the cooling air from the inlet to the outlet through the cooling fan.

2. A portable power working machine, comprising:

an operating arm;

a drive shaft extending through the operating arm;

a motor housing connected to a proximal end of the operating arm at a front end thereof;

an actuating part attached to a distal end of the operating arm; and a drive unit disposed in the motor housing, the drive unit driving the actuating part through the drive shaft, wherein the motor housing has an inlet for cooling air at a position near a front end thereof and an outlet for the cooling air at a position near a rear end opposite to the front end thereof, wherein the drive unit includes an electric motor disposed near the front end of the motor housing, a cooling fan disposed near the rear end of the motor housing and connected to an output shaft of the electric motor, and a heat sink disposed between the cooling fan and the electric motor so as to extend from the electric motor, and wherein the cooling air drawn into the motor housing through the inlet in the motor housing by the cooling fan is guided through a gap between the drive unit and an inner surface of the motor housing and is discharged to the outside through the outlet in the motor housing.

3. The portable power working machine according to clam 2, wherein the electric motor includes a stator and an electric motor cover, and has a cooling-air introduction opening provided between the stator and the electric motor cover and a cooling-air discharge opening provided in the electric motor cover at a position near the rear end of the motor housing, and wherein the cooling air drawn into the motor housing through the inlet in the motor housing by the cooling fan is guided into the electric motor through the cooling-air introduction opening and out of the electric motor through the cooling-air discharge opening, and is discharged to the outside through the outlet in the motor housing.

4. The portable power working machine according to claim 1, wherein the heat sink is disposed near the inlet in the motor housing.

5. The portable power working machine according to claim 2, wherein the heat sink is disposed near the inlet in the motor housing.

6. The portable power working machine according to claim 1, wherein the inlet in the motor housing has a cooling air guide that guides the cooling air in the circumferential direction of the output shaft.

7. The portable power working machine according to claim 2, wherein the inlet in the motor housing has a cooling air guide that guides the cooling air in the circumferential direction of the output shaft.

8. The portable power working machine according to claim 2, further comprising a shoulder carrying member at a position near the proximal end of the operating arm.

9. The portable power working machine according to claim 1, wherein the actuating part is a cutting blade that is rotated by the rotation of the drive shaft.

10. The portable power working machine according to claim 2, wherein the actuating part is a cutting blade that is rotated by the rotation of the drive shaft.

* * * * *